United States Patent
Kennedy

(10) Patent No.: US 11,143,625 B2
(45) Date of Patent: Oct. 12, 2021

(54) ULTRASONIC INSPECTION OF PARTS

(71) Applicant: The Boeing Company, Chicago, IL (US)

(72) Inventor: James C. Kennedy, Port Angeles, WA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 16/684,499

(22) Filed: Nov. 14, 2019

(65) Prior Publication Data

US 2021/0148863 A1 May 20, 2021

(51) Int. Cl.
  *G01B 17/02* (2006.01)
  *G01N 29/22* (2006.01)
  *G01N 29/07* (2006.01)

(52) U.S. Cl.
  CPC ............ *G01N 29/07* (2013.01); *G01B 17/02* (2013.01); *G01N 29/221* (2013.01); *G01N 2291/011* (2013.01); *G01N 2291/0231* (2013.01); *G01N 2291/0289* (2013.01); *G01N 2291/263* (2013.01)

(58) Field of Classification Search
  CPC ...... G01B 17/02; G01N 29/07; G01N 29/221; G01N 2291/0289; G01N 2291/011; G01N 2291/263; G01N 2291/0231
  USPC .......................................................... 73/598
  See application file for complete search history.

(56) References Cited

U.S. PATENT DOCUMENTS

| | | | |
|---|---|---|---|
| 8,960,006 B2* | 2/2015 | Isobe | G01N 29/069 73/602 |
| 9,730,673 B2* | 8/2017 | Robert | A61B 8/145 |
| 10,128,686 B1* | 11/2018 | Leabman | H02J 50/80 |
| 2012/0118064 A1* | 5/2012 | Matsumoto | G01N 29/043 73/632 |
| 2013/0340531 A1* | 12/2013 | Hutchinson | G01N 29/043 73/633 |
| 2017/0085112 A1* | 3/2017 | Leabman | H02J 50/402 |
| 2019/0004013 A1* | 1/2019 | Choi | G01N 29/22 |

FOREIGN PATENT DOCUMENTS

| | | | | |
|---|---|---|---|---|
| GB | 201808654 | * | 7/2018 | ............ G01N 29/07 |
| WO | WO2019111381 | * | 6/2019 | ........... G01N 29/069 |

* cited by examiner

*Primary Examiner* — Jacques M Saint Surin
(74) *Attorney, Agent, or Firm* — Haynes and Boone, LLP

(57) ABSTRACT

Systems, methods, and apparatus for ultrasonic inspection of parts are disclosed. A method for inspection of a part comprises transmitting, by a source, an initial signal towards the part. The method further comprises reflecting, off of a surface of the part, the initial signal to generate a surface reflection signal. Also, the method comprises receiving, by a receiver, the surface reflection signal. In addition, the method comprises determining, by a processor(s), a shape of the surface of the part by using a magnitude of the surface reflection signal and an echo travel time of the initial signal with respect to the surface reflection signal. Additionally, the method comprises determining, by a processor(s), a surface inspection signal commensurate with the shape of the surface of the part. Further, the method comprises transmitting, by the source, the surface inspection signal towards the part for inspection of the surface of the part.

20 Claims, 16 Drawing Sheets

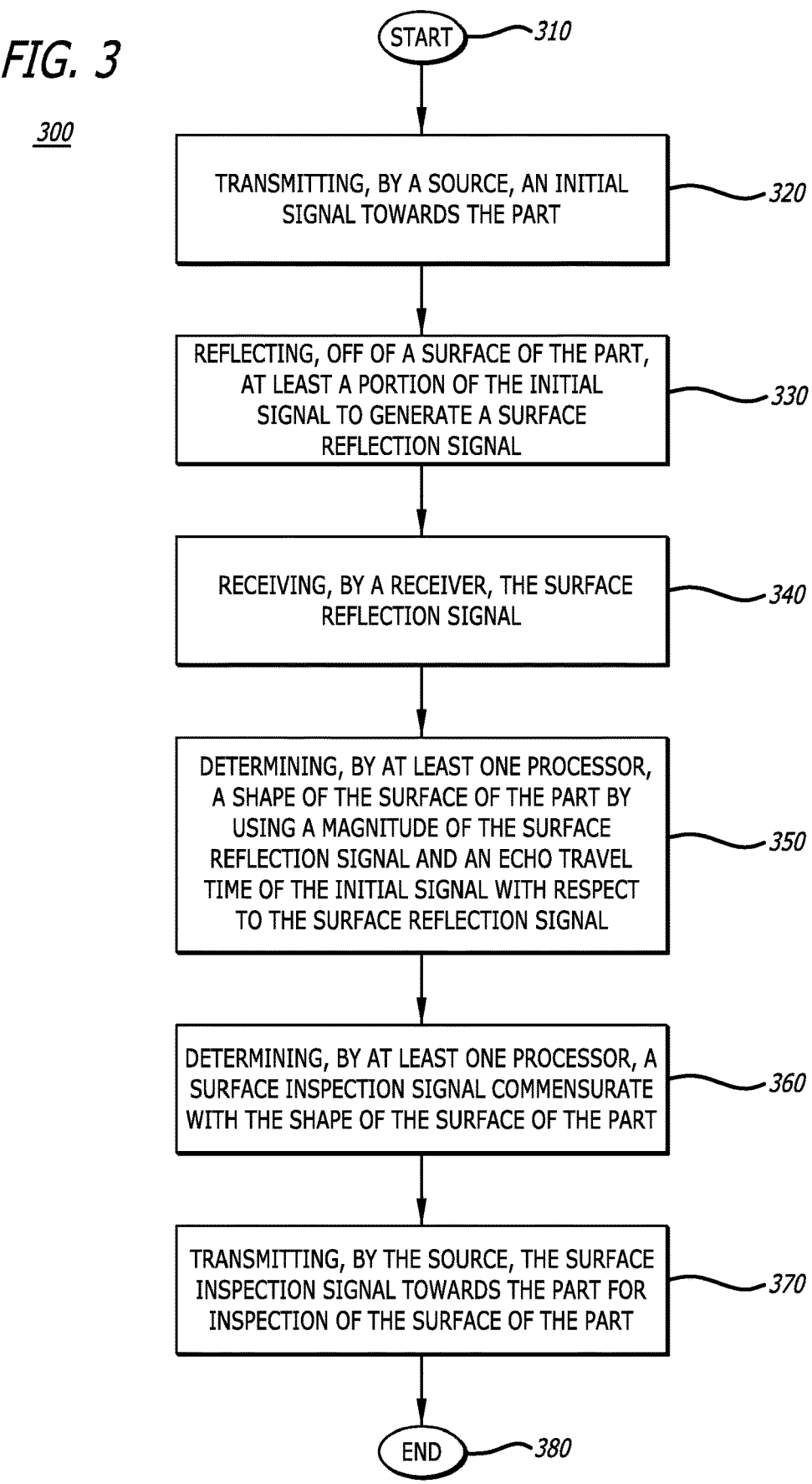

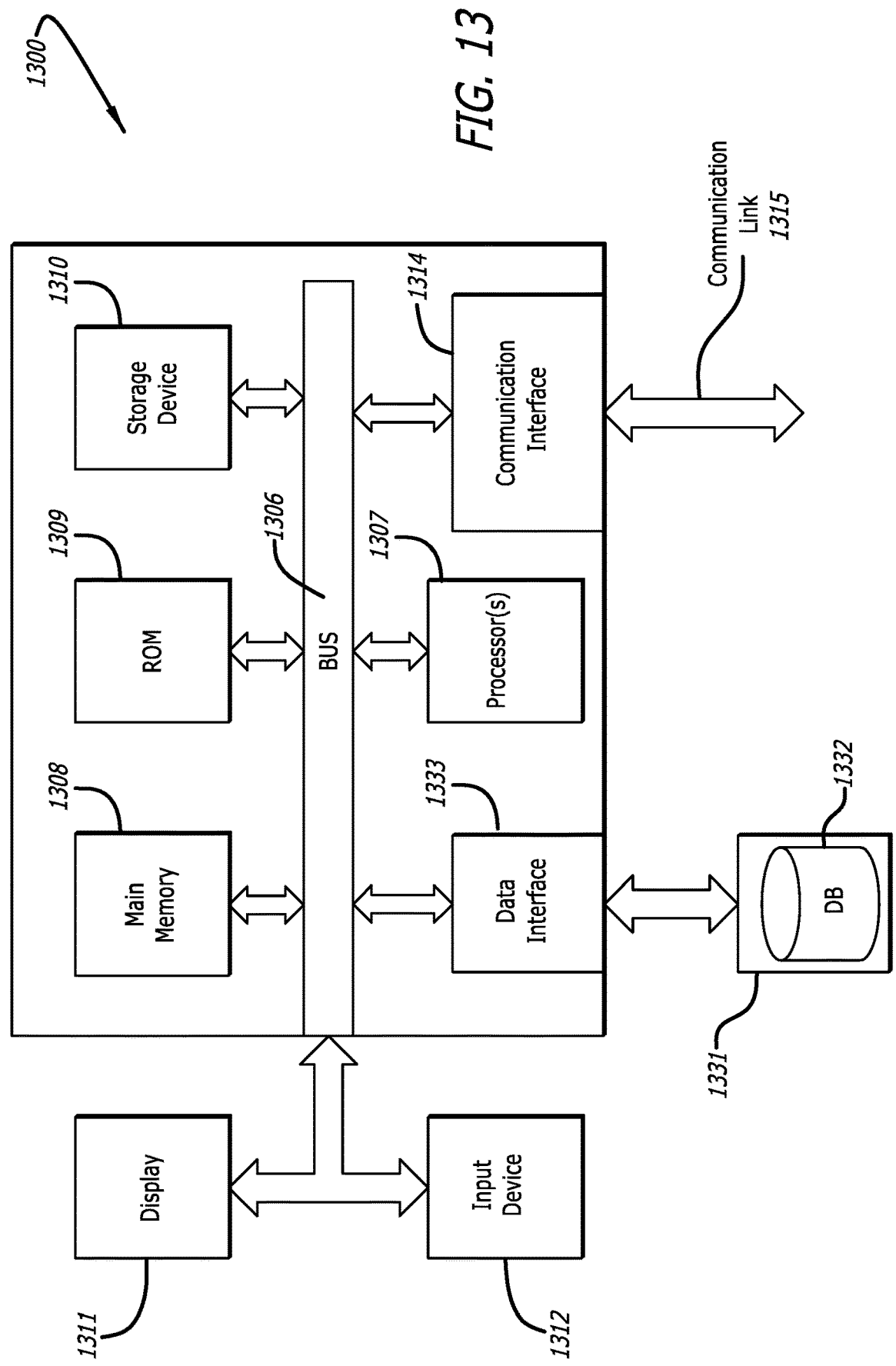

ULTRASONIC INSPECTION OF PARTS

FIELD

The present disclosure relates to inspection of parts. In particular, the present disclosure relates to ultrasonic inspection of parts.

BACKGROUND

Currently, large scale monolithic composite aircraft structures, especially those with internal cavities, make use of soft tooling (e.g., urethane casting using silicon molds). Soft tooling creates surfaces that are only approximately known in shape. Existing solutions for inspecting a surface shape involve expensive, complex mechanical devices that result in production down time and costly ongoing maintenance. One existing solution involves using a small oscillating mechanical fixture to inspect the surface shape of the structure. However, these small oscillating mechanical fixtures are fragile and complex, and often must be sent out for maintenance. As such, several backup units must be maintained and always available for use.

A second solution involves the use of synthetic aperture ultrasonic imaging. For this method, a wide diverging beam is transmitted from a line of emission points on an ultrasonic array, and algorithms are used to reconstruct the complete set of data received into a usable non-destructive inspection (NDI) image. However, the generated NDI image is not refined enough and, as such, is not sufficient to reveal minor defects on the surface. To date these existing solutions fail to meet specification requirements for defect detectability.

In light of the foregoing, there is a need for improved technique for inspection of parts.

SUMMARY

The present disclosure relates to a method, system, and apparatus for ultrasonic inspection of parts. In one or more embodiments, a method for inspection of a part comprises transmitting, by a source, an initial signal towards the part. The method further comprises reflecting, off of a surface of the part, at least a portion of the initial signal to generate a surface reflection signal. Also, the method comprises receiving, by a receiver, the surface reflection signal. In addition, the method comprises determining, by at least one processor, a shape of the surface of the part by using a magnitude of the surface reflection signal and an echo travel time of the initial signal with respect to the surface reflection signal. Additionally, the method comprises determining, by at least one processor, a surface inspection signal commensurate with the shape of the surface of the part. Further, the method comprises transmitting, by the source, the surface inspection signal towards the part for inspection of the surface of the part.

In one or more embodiments, the initial signal and the surface inspection signal are both ultrasonic signals. In at least one embodiment, the initial signal is a pulsed signal. In some embodiments, the surface inspection signal is a pulsed signal. In one or more embodiments, the source and the receiver are combined within a single unit.

In at least one embodiment, the source transmits the initial signal via antenna elements. In one or more embodiments, the antenna elements are configured in an array. In some embodiments, the array has a concave shape. In at least one embodiment, the receiver receives the surface reflection signal via antenna elements.

In one or more embodiments, a method for inspection of a part comprises transmitting, by a source, an initial signal towards the part. The method further comprises reflecting, off of a surface of the part, at least a portion of the initial signal to generate a surface reflection signal. Also, the method comprises reflecting, off of a back surface of the part, at least a portion of the initial signal to generate a back surface reflection signal. In addition, the method comprises receiving, by a receiver, the surface reflection signal and the back surface reflection signal. Additionally, the method comprises determining, by at least one processor, a shape of the surface of the part by using a magnitude of the surface reflection signal and an echo travel time of the initial signal with respect to the surface reflection signal. In addition, the method comprises determining, by the at least one processor, a thickness of the part by using a magnitude of the back surface reflection signal and an echo travel time of the initial signal with respect to the back surface reflection signal. Also, the method comprises determining, by the at least one processor, a full part inspection signal commensurate with the shape of the surface of the part and the thickness of the part. Further, the method comprises transmitting, by the source, the full part inspection signal towards the part for full inspection of the part.

In at least one embodiment, the initial signal and the full part inspection signal are both ultrasonic signals.

In one or more embodiments, a system for inspection of a part comprises a source to transmit an initial signal towards the part, and to transmit a surface inspection signal towards the part for inspection of a surface of the part. In one or more embodiments, at least a portion of the initial signal reflects off of the surface of the part to generate a surface reflection signal. The system further comprises a receiver to receive the surface reflection signal. Further, the system comprises at least one processor to determine a shape of the surface of the part by using a magnitude of the surface reflection signal and an echo travel time of the initial signal with respect to the surface reflection signal, and to determine the surface inspection signal, which is commensurate with the shape of the surface of the part.

In at least one embodiment, the source is configured to transmit the initial signal via antenna elements. In one or more embodiments, the receiver is configured to receive the surface reflection signal via antenna elements.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 is a diagram illustrating a conventional method for ultrasonic inspection of a part.

FIGS. 2A, 2B, and 2C are diagrams that together illustrate the disclosed method for ultrasonic inspection of a part, in accordance with at least one embodiment of the present disclosure.

FIG. 3 is a flow chart showing the disclosed method for ultrasonic inspection of a surface of a part, in accordance with at least one embodiment of the present disclosure.

FIG. 8 is a diagram showing a first section of the antenna elements transmitting and receiving to a first portion of the surface of the part, in accordance with at least one embodiment of the present disclosure.

FIG. 9 is a diagram showing a second section of the antenna elements transmitting and receiving to a second portion of the surface of the part, in accordance with at least one embodiment of the present disclosure.

FIG. 10 is a diagram showing a third section of the antenna elements transmitting and receiving to a third portion of the surface of the part, in accordance with at least one embodiment of the present disclosure.

FIG. 11 is a diagram showing a fourth section of the antenna elements transmitting and receiving to a fourth portion of the surface of the part, in accordance with at least one embodiment of the present disclosure.

FIG. 13 illustrates a block diagram of an illustrative computing system suitable for implementing an embodiment of the present disclosure, in accordance with at least one embodiment of the present disclosure.

DESCRIPTION

Figure 1:
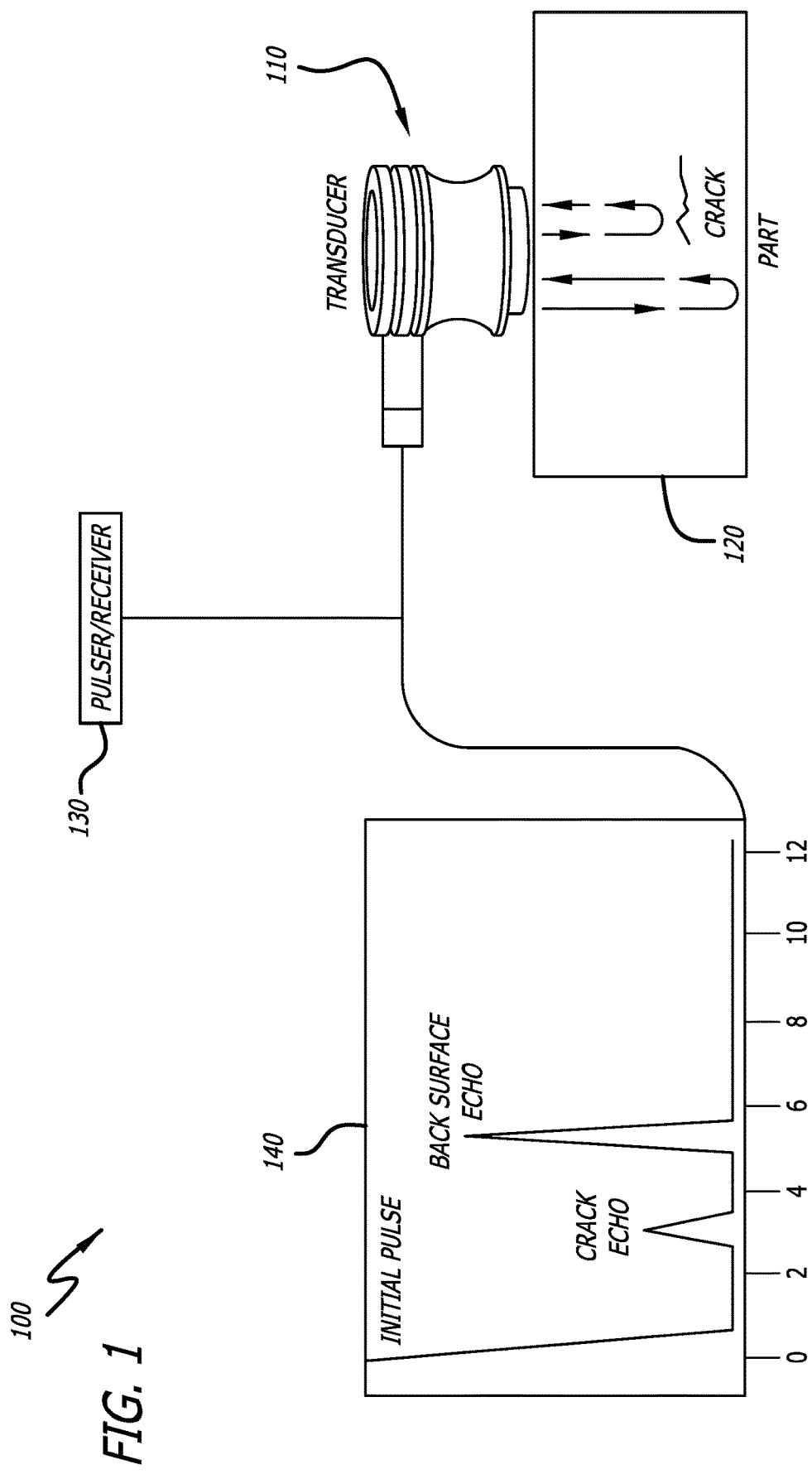

The methods and apparatus disclosed herein provide operative systems for ultrasonic inspection of parts. In one or more embodiments, the system of the present disclosure provides a means for ultrasonic inspection where each interrogating ultrasonic pulse is preceded by an initial ultrasonic pulse that provides necessary information on the shape of the part surface.

During operation of the disclosed system, a part of an incompletely known surface (e.g., a composite surface) is presented to the inspection system. An initial ultrasonic pulse applied to the surface of the part provides the amplitude and echo arrival time information that is relatable to the shape of the part surface. An algorithm executes that calculates the electronic characteristics for the interrogating ultrasonic pulse (e.g., comprising ultrasonic beams) required to inspect the now known surface shape. Then, the interrogating pulse is generated and applied to the surface of the part for inspection of the part.

The system of the present disclosure uses only conventional ultrasonic array interrogation beams for detection of defects on the surface of a part. These beams are well formulated because the part shape is known as the initial pulse returns the part shape information.

It should be noted that for successful ultrasonic inspection of a laminated composite part, the incident beam must be approximately normal to the part surface. In one or more embodiments, the system of the present disclosure uses the initial ultrasonic pulse to determine the part surface shape, and a second inspection ultrasonic pulse, which is transmitted approximately normal to the part surface, to inspect the part.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to ultrasonic testing (UT), and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

FIG. 1 is a diagram 100 illustrating a conventional method for ultrasonic inspection of a part 120. In this figure, a combined pulser/receiver (e.g., a source and receiver combined within a single unit) 130 is shown to be connected to a transducer 110 and to a display (e.g., a display device) 140. The combined pulser/receiver 130 is an electronic device that can produce and receive high voltage electrical pulses. The transducer 110 is an electronic device that converts electrical pulses into ultrasonic signals. The transducer 110 is shown to be located proximate the part 120 to be inspected.

During operation, the pulser (i.e. source) of the combined pulser/receiver 130 sends a high voltage electrical pulse to the transducer 110 to drive the transducer 110 to generate an ultrasonic signal (e.g., high frequency ultrasonic energy, such as 0.5 to 15 megahertz (MHz)). The ultrasonic signal is radiated from the transducer 110 to the part 120. When the signal reaches a discontinuity (e.g., such as a crack) within its path, a portion of the energy of the signal will be reflected from the discontinuity location (e.g., the location of a crack) back towards the transducer 110. It should be noted that ultrasonic signals are sensitive to both surface and subsurface discontinuities.

For example, as shown in FIG. 1, when the signal reaches a crack (i.e. a discontinuity location) in the part 120, a portion of the signal is reflected back towards the transducer 110. The remaining portion of the signal will continue to propagate through the part 120 until it reaches the bottom (e.g., back surface) of the part 120, which is also a discontinuity location (e.g., a discontinuity between the material of the part 120 and the atmosphere or material of the test bench). When the remaining portion of the signal reaches the bottom of the part 120, it will reflect back towards the transducer 110.

The transducer 110 will transform the reflected signals into electrical energy. The electrical energy is then sent to the receiver of the combined pulser/receiver 130 and to the display 140. A screen of the display 140 then displays the received electrical energy in the form of a graph (e.g., where the x-axis represents time in seconds (s) and the y-axis represents the magnitude of the energy of the signal). For example, as shown on display 140, after the initial ultrasonic pulse is sent to the part 120, the reflected signal from the crack (e.g., crack echo) is received and the reflected signal from the bottom of the part 120 (e.g., back surface echo) is received.

Figure 2A:
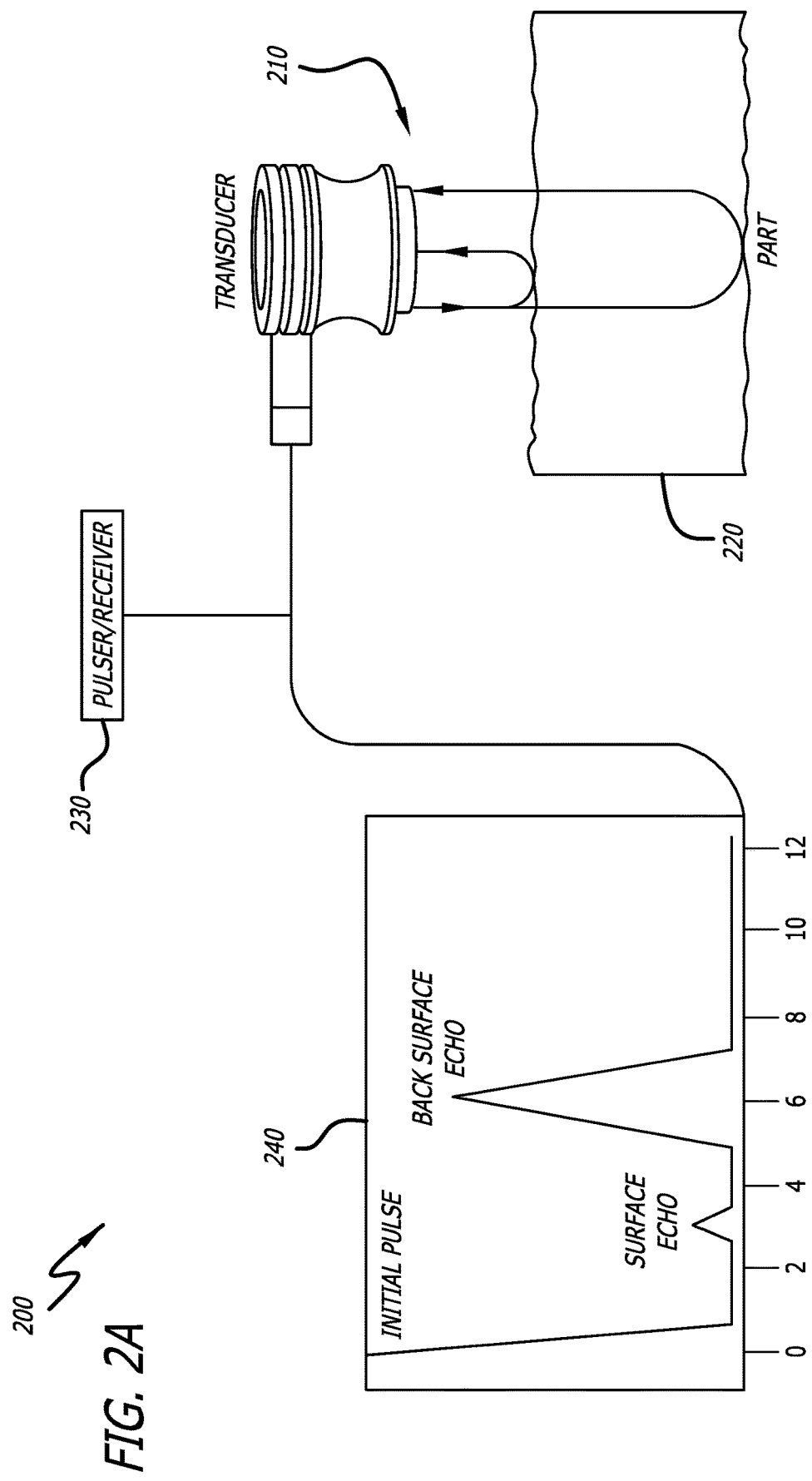
FIG. 2A is a diagram showing the transmitting and receiving of an initial signal for initial inspection of the part, in accordance with at least one embodiment of the present disclosure.
Figure 2B:
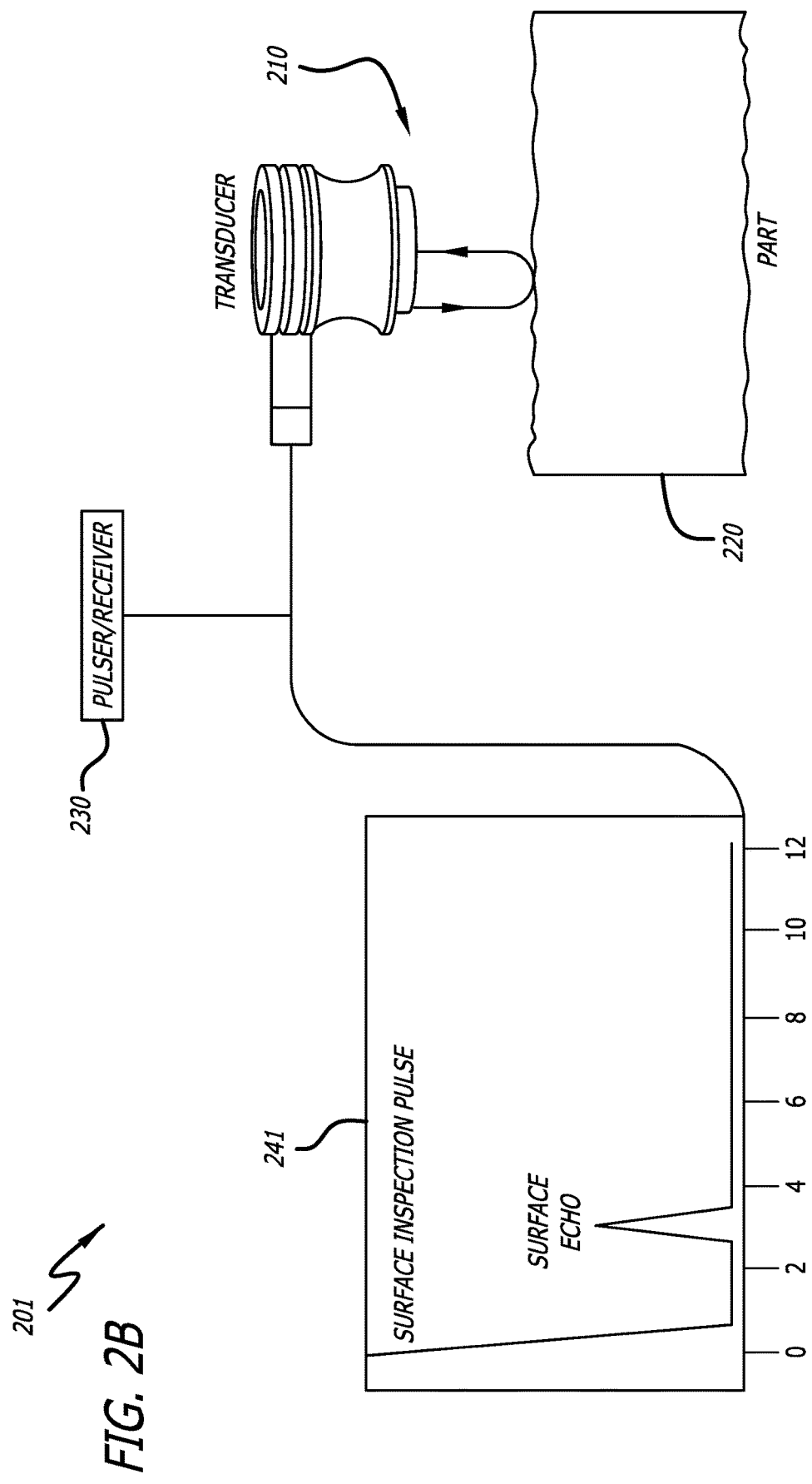
FIG. 2B is a diagram showing the transmitting and receiving of a surface inspection signal for inspection of the surface of the part, in accordance with at least one embodiment of the present disclosure.
Figure 2C:
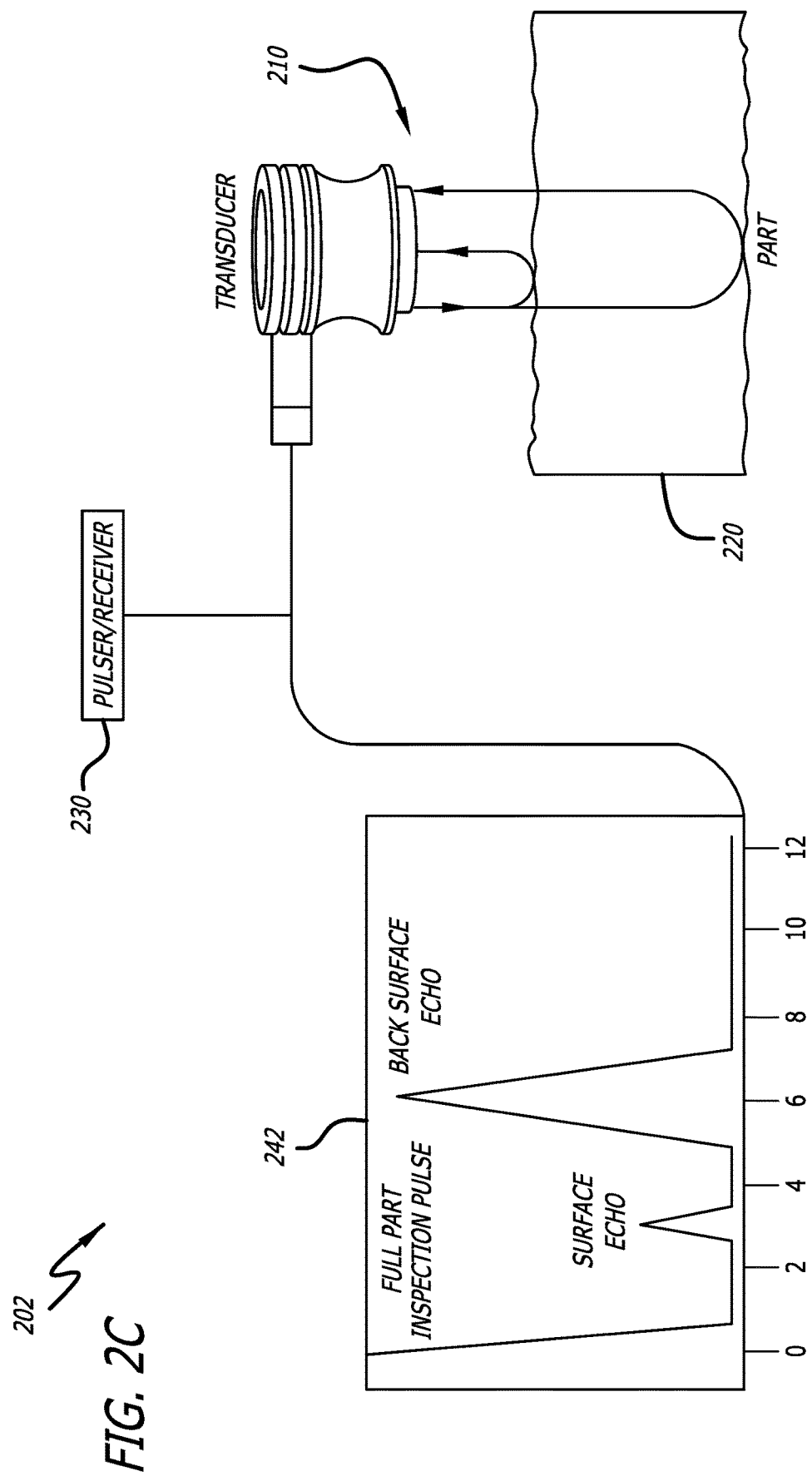
FIG. 2C is a diagram showing the transmitting and receiving of a full part inspection signal for full inspection of the part, in accordance with at least one embodiment of the present disclosure.

FIGS. 2A, 2B, and 2C are diagrams 200, 201, 202 that together illustrate the disclosed method for ultrasonic inspection of a part 220, in accordance with at least one embodiment of the present disclosure. In these figures, a combined pulser/receiver (e.g., a source and receiver combined within a single unit) 230 is shown to be connected to a transducer 210 and to a display (e.g., a display device) 240, 241, 242. The combined pulser/receiver 230 is an electronic device that can produce and receive high voltage electrical pulses. It should be note that in some embodiments, the pulser (i.e. source) and the receiver may not be combined within a single unit as shown in these figures, but rather may be two separate units. The transducer 210 is an electronic device that converts electrical pulses into ultrasonic signals. The transducer 210 is shown to be located above the part 220 to be inspected.

During operation of the disclosed method, an initial ultrasonic signal (e.g., initial ultrasonic pulse) is first transmitted to the part 220 to determine the shape of the surface of the part 220 (and optionally the thickness of the part 220) for initial inspection (e.g., a low resolution inspection) of the part 220. Then, the now known shape of the surface of the part 220 is used to determine a surface inspection signal, which is used to inspect the surface of the part 220 with high resolution. Optionally, the now known shape of the surface of the part 220 along with the now known thickness of the part 220 are used to determine a full part inspection signal, which is used to perform full inspection of the part 220 with high resolution.

FIG. 2A is a diagram 200 showing the transmitting and receiving of an initial signal (e.g., initial pulse) for initial inspection of the part 220, in accordance with at least one embodiment of the present disclosure. In this figure, the pulser (i.e. source) of the combined pulser/receiver 230 transmits a high voltage electrical pulse to the transducer 210 to drive the transducer 210 to generate an initial ultrasonic signal (e.g., high frequency ultrasonic energy, such as 0.5 to 15 megahertz (MHz)). The initial signal is radiated from the transducer 210 to the part 220. As such, the source transmits the initial signal to the part 220 via the transducer 210.

When the initial signal reaches a discontinuity (e.g., such as the top surface of the part 220) within its path, part of the energy of the initial signal will be reflected from the discontinuity location (e.g., the surface of the part 220) back towards the transducer 210. As shown in FIG. 2A, when the initial signal reaches the surface (i.e. top surface) (i.e. a discontinuity location) of the part 220, a portion of the initial signal is reflected off of the surface of the part 220 to generate a surface reflection signal, which is radiated back towards the transducer 210.

The remaining portion of the initial signal will continue to propagate through the part 220 until it reaches the bottom (e.g., back surface) of the part 220, which is also a discontinuity location. When the remaining portion of the initial signal reaches the bottom of the part 220, the remaining portion of the initial signal is reflected off of the bottom of the part 220 to generate a back surface reflection signal, which is also radiated back towards the transducer 210.

The transducer 110 then transforms the reflected signals into electrical energy. The electrical energy is then sent to and received by the receiver of the combined pulser/receiver 130. As such, the receiver receives the surface reflection signal and the back surface reflection signal via the transducer 210.

The electrical energy is also sent to the display 240. Then, a screen of the display 240 displays the received electrical energy in the form of a graph (e.g., where the x-axis represents time in seconds (s) and the y-axis represents the magnitude of the energy of the signal). As shown on display 240, after the initial signal (e.g., initial pulse) is sent to the part 220, the surface reflection signal (i.e. surface echo) from the surface of the part 220 is received and the back surface reflection signal (i.e. back surface echo) from the bottom of the part 220 is received.

After the receiver receives the electrical energy of the surface reflection signal and the back surface reflection signal, the receiver transmits (e.g., via communication link 1315, communication interface 1314, and bus 1306 of FIG. 13) the electrical energy of the surface reflection signal (and optionally the electrical energy of the back surface reflection signal) to a least one processor (e.g., refer to processor(s) 1307 of FIG. 13) for processing. The processor(s) then determines the shape of the surface of the part 220 by using a magnitude of the electrical energy of the surface reflection signal and an echo travel time of the initial signal with respect to the surface reflection signal (e.g., the difference in time between the transmission of the initial signal and the receiving of the surface reflection signal). Optionally, the processor(s) also determines the thickness of the part 220 by using a magnitude of the electrical energy of the back surface reflection signal and an echo travel time of the initial signal with respect to the back surface reflection signal (e.g., the difference in time between the transmission of the initial signal and the receiving of the back surface reflection signal).

After the processor(s) determines the shape of the part 220 (and optionally the thickness of the part 220), the processor(s) determines a surface inspection signal commensurate with the now known shape of the surface of the part 220 in order to better inspect the surface of the part 220 for any minor irregularities and/or defects (e.g., delamination of composite materials). Optionally, instead of determining a surface inspection signal, the processor(s) determines a full part inspection signal commensurate with the now known shape of the surface of the part 220 and the now known thickness of the part 220 in order to perform full inspection of the part 220 for any minor irregularities and/or defects (e.g., delamination of composite materials and/or discontinuities in composite materials) on the surface of and/or within the part 220.

After the processor(s) determines the surface inspection signal (or optionally the full part inspection signal) to be used to inspect the part 220, the processor(s) will command the pulser (i.e. source) to transmit a high voltage electrical pulse to the transducer 210 to drive the transducer 210 to generate the surface inspection signal (or optionally the full part inspection signal) to inspect the part 220 accordingly with high resolution.

In particular, FIG. 2B is a diagram showing the transmitting and receiving of the surface inspection signal for inspection of the surface of the part 220, in accordance with at least one embodiment of the present disclosure. In this figure, the pulser (i.e. source) of the combined pulser/receiver 230 transmits a high voltage electrical pulse to the transducer 210 to drive the transducer 210 to generate the ultrasonic surface inspection signal (e.g., high frequency ultrasonic energy, such as 0.5 to 15 megahertz (MHz)). The surface inspection signal is radiated from the transducer 210 to the part 220. Thus, the source transmits the surface inspection signal to the part 220 via the transducer 210.

When the surface inspection signal reaches the surface (i.e. top surface) (i.e. a discontinuity location) of the part 220, at least a portion of the surface inspection signal is reflected off of the surface of the part 220 to generate a high resolution surface reflection signal, which is radiated back towards the transducer 210.

The transducer 110 then transforms the high resolution surface reflection signal into electrical energy. The electrical energy is then sent to and received by the receiver of the combined pulser/receiver 130. As such, the receiver receives the high resolution surface reflection signal via the transducer 210.

The electrical energy is also sent to the display 241. Then, a screen of the display 241 displays the received electrical energy in the form of a graph (e.g., where the x-axis represents time in seconds (s) and the y-axis represents the magnitude of the energy of the signal). As shown on display 241, after the surface inspection signal (e.g., surface inspection pulse) is sent to the part 220, the high resolution surface reflection signal (i.e. surface echo) from the surface of the part 220 is received. It should be noted that the magnitude of the high resolution surface reflection signal (i.e. surface echo) on display 241 of FIG. 2B is shown to be higher than the magnitude of the surface reflection signal (i.e. surface echo) on display 240 of FIG. 2A because the surface inspection signal will be radiating higher energy to the location of the surface of the part 220 in order to better inspect the surface with a higher resolution.

After the receiver receives the electrical energy of the high resolution surface reflection signal, the receiver transmits (e.g., via communication link 1315, communication interface 1314, and bus 1306 of FIG. 13) the electrical energy of the high resolution surface reflection signal to a least one processor (e.g., refer to processor(s) 1307 of FIG. 13) for processing. The processor(s) then processes the electrical energy of the high resolution surface reflection signal to determine whether the surface of the part 220 has any irregularities and/or defects.

FIG. 2C is a diagram showing the transmitting and receiving of the full part inspection signal for full inspection of the part 220, in accordance with at least one embodiment of the present disclosure. In this figure, the pulser (i.e. source) of the combined pulser/receiver 230 transmits a high voltage electrical pulse to the transducer 210 to drive the transducer 210 to generate the ultrasonic full part inspection signal (e.g., high frequency ultrasonic energy, such as 0.5 to 15 megahertz (MHz)). The full part inspection signal is radiated from the transducer 210 to the part 220. Thus, the source transmits the full part inspection signal to the part 220 via the transducer 210.

When the full part inspection signal reaches the surface (i.e. top surface) (i.e. a discontinuity location) of the part 220, a portion of the full part inspection signal is reflected off of the surface of the part 220 to generate a high resolution surface reflection signal, which is radiated back towards the transducer 210.

The remaining portion of the full part inspection signal will continue to propagate through the part 220 until it reaches the bottom (e.g., back surface) of the part 220, which is also a discontinuity location. When the remaining portion of the full part inspection signal reaches the bottom of the part 220, the remaining portion of the full part inspection signal is reflected off of the bottom of the part 220 to generate a high resolution back surface reflection signal, which is also radiated back towards the transducer 210.

The transducer 110 then transforms the high resolution surface reflection signal and the high resolution back surface reflection signal into electrical energy. The electrical energy is then sent to and received by the receiver of the combined pulser/receiver 130. As such, the receiver receives the high resolution surface reflection signal and the high resolution back surface reflection signal via the transducer 210.

The electrical energy is also sent to the display 242. A screen of the display 242 then displays the received electrical energy in the form of a graph (e.g., where the x-axis represents time in seconds (s) and the y-axis represents the magnitude of the energy of the signal). Display 242 shows that after the full part inspection signal (e.g., full part inspection pulse) is sent to the part 220, the high resolution surface reflection signal (i.e. surface echo) from the surface of the part 220 and the high resolution back surface reflection signal (i.e. back surface echo) from the bottom of the part 220 is received.

It should be noted that the magnitude of the high resolution surface reflection signal (i.e. surface echo) on display 242 of FIG. 2C is shown to be higher than the magnitude of the surface reflection signal (i.e. surface echo) on display 240 of FIG. 2A because the full part inspection signal will be radiating higher energy to the location of the surface of the part 220 in order to better inspect the surface with a higher resolution. In addition, the magnitude of the high resolution back surface reflection signal (i.e. back surface echo) on display 242 of FIG. 2C is shown to be higher than the magnitude of the back surface reflection signal (i.e. surface echo) on display 240 of FIG. 2A because the full part inspection signal will be radiating higher energy to the body (including the bottom) of the part 220 in order to better inspect the full part with a higher resolution.

After the receiver receives the electrical energy of the high resolution surface reflection signal and the high resolution back surface reflection signal, the receiver transmits (e.g., via communication link 1315, communication interface 1314, and bus 1306 of FIG. 13) the electrical energy of the high resolution surface reflection signal and the high resolution back surface reflection signal to a least one processor (e.g., refer to processor(s) 1307 of FIG. 13) for processing. The processor(s) then processes the electrical energy of the high resolution surface reflection signal to determine whether the surface of the part 220 has any irregularities and/or defects and the and the high resolution back surface reflection signal to determine whether the bottom of the part 220 has any irregularities and/or defects.

FIG. 3 is a flow chart showing the disclosed method 300 for ultrasonic inspection of a surface of a part, in accordance with at least one embodiment of the present disclosure. At the start 310 of the method 300, a source transmits an initial signal towards the part 320. Then, at least a portion of the initial signal reflects off of a surface of the part to generate a surface reflection signal 330. A receiver then receives the surface reflection signal 340. Then, at least one processor determines a shape of the surface of the part by using a magnitude of the surface reflection signal and an echo travel time of the initial signal with respect to the surface reflection signal 350. At least one processor then determines a surface inspection signal commensurate with the shape of the surface of the part 360. Then, the source transmits the surface inspection signal towards the part for inspection of the surface of the part 370. Then, the method ends 380.

Figure 4:
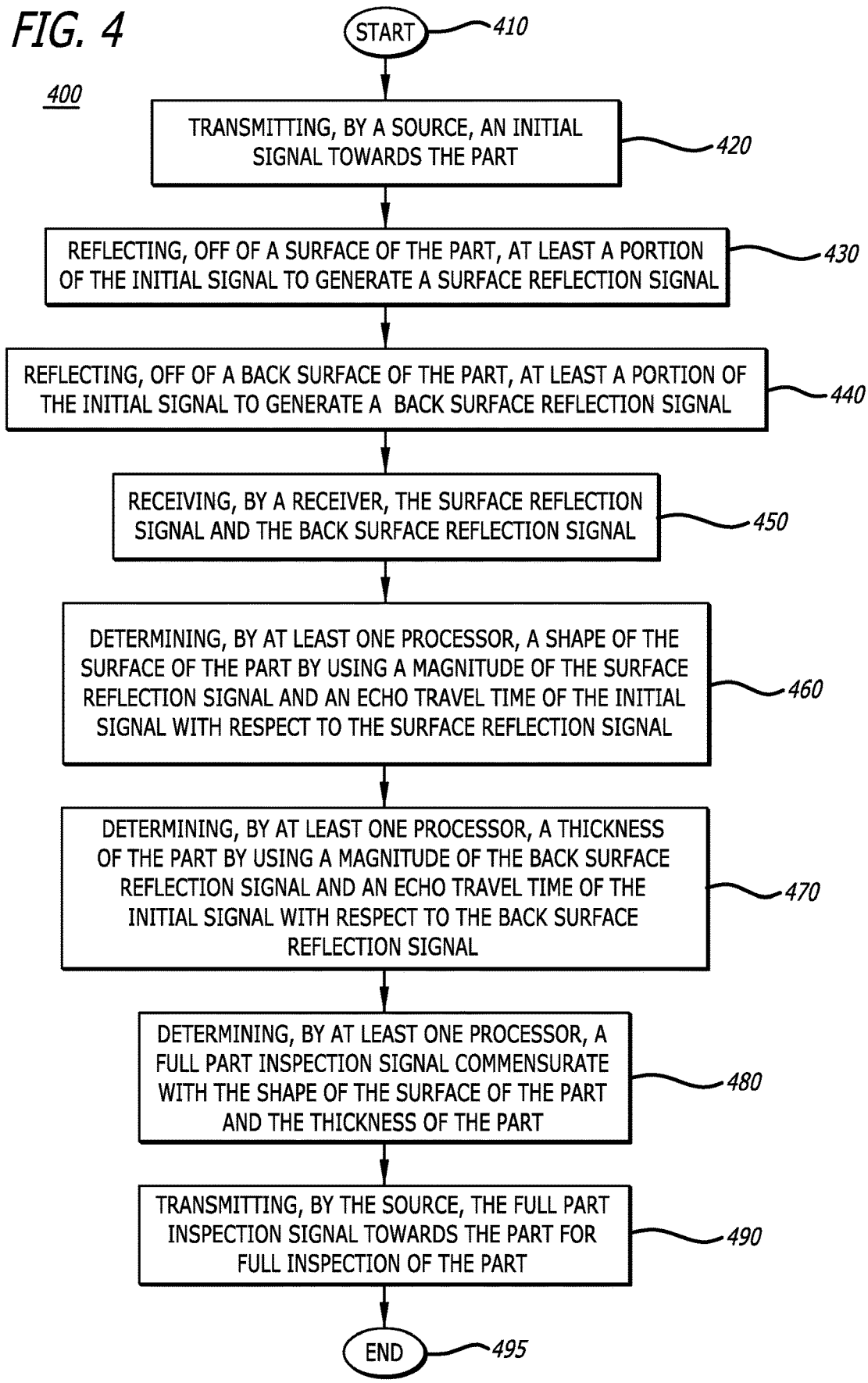
FIG. 4 is a flow chart showing the disclosed method for ultrasonic inspection of the full part, in accordance with at least one embodiment of the present disclosure.

FIG. 4 is a flow chart showing the disclosed method 400 for ultrasonic inspection of the full part, in accordance with at least one embodiment of the present disclosure. At the start 410 of the method 400, a source transmits an initial signal towards the part 420. Then, at least a portion of the initial signal reflects off of a surface of the part to generate a surface reflection signal 430. Also, at least a portion of the initial signal reflects off of a back surface of the part to generate a back surface reflection signal 440. A receiver then receives the surface reflection signal and the back surface reflection signal 450. Then, at least one processor determines a shape of the surface of the part by using a magnitude of the surface reflection signal and an echo travel time of the initial signal with respect to the surface reflection signal 460. Also, the processor determines a thickness of the part by using a magnitude of the back surface of the reflection signal and an echo travel time of the initial signal with respect to the back surface reflection signal 470. Then, at least one processor determines a full part inspection signal commensurate with the shape of the surface of the part and the thickness of the part 480. The source then transmits the full part inspection signal towards the part for full inspection of the part 490. Then, the method 400 ends 495.

Figure 5:
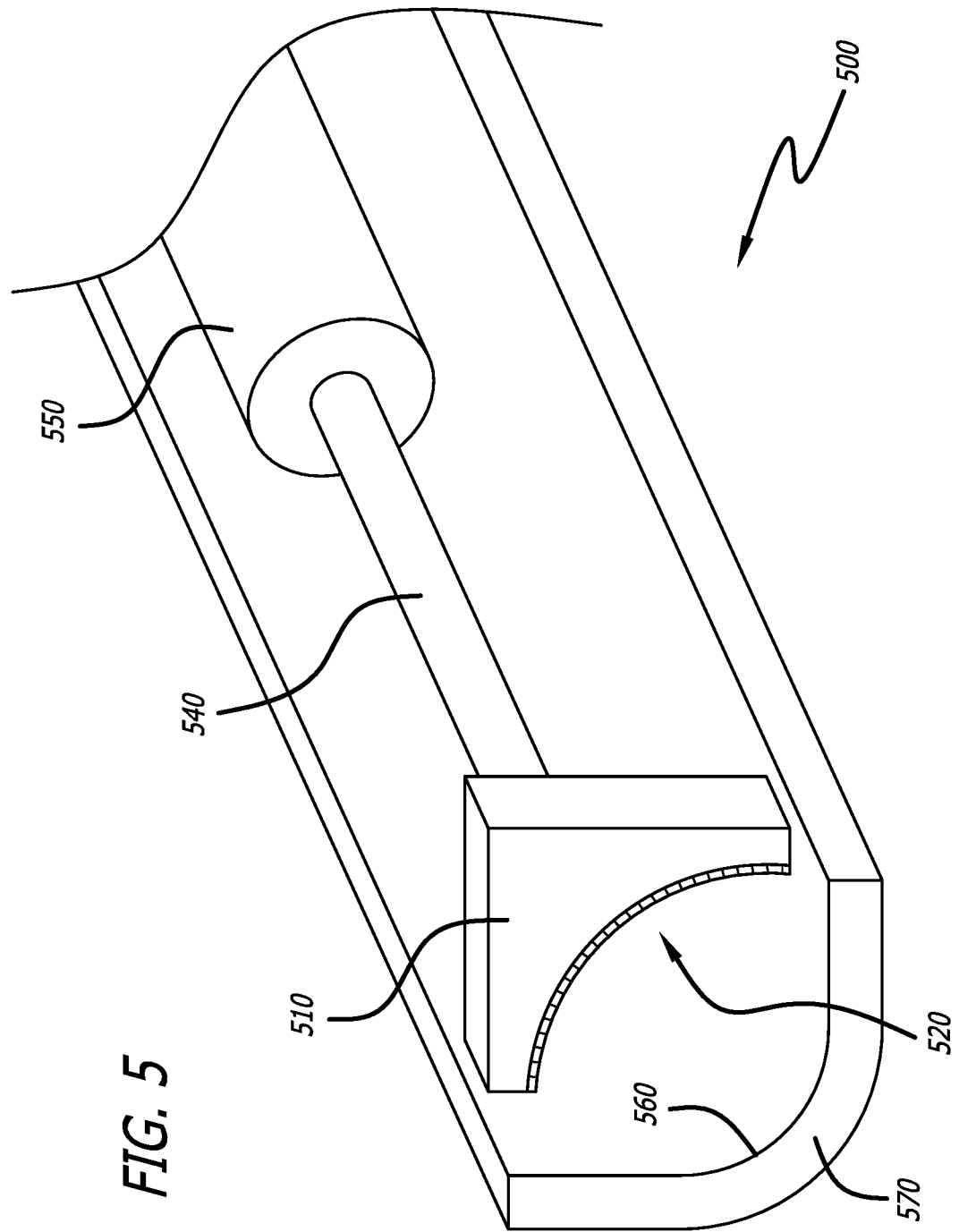
FIG. 5 is a diagram showing the disclosed system for ultrasonic inspection of a part, where the system employs an antenna apparatus comprising a right angle shape, in accordance with at least one embodiment of the present disclosure.

FIG. 5 is a diagram 500 showing the disclosed system for ultrasonic inspection of a part 570, where the system employs an antenna apparatus 510 comprising a right angle shape, in accordance with at least one embodiment of the present disclosure. In this figure, the antenna apparatus 510 is manufactured such that the top of the antenna apparatus 510 comprises a right angle shape. It should be noted that in other embodiments, the antenna apparatus 510 may comprise may different types of shapes (e.g., refer to antenna apparatus 1210 of FIG. 12B) than the particular right angle shape as is shown in FIG. 5.

In addition, the antenna apparatus 510 is shown to comprise a plurality of antenna elements 520 that are configured in an array. In other embodiments, the antenna elements 520 may be configured in other configurations other than an array, such as a matrix. In the embodiment of this figure, the array of antenna elements 520 is curved and has a concave shape. In other embodiments, the array (or other configuration, such as a matrix) of antenna elements 520 may be curved in a convex shape.

Also in this figure, the antenna apparatus 510 is shown to be connected to a rod 540, which is connected to a base 550. In one or more embodiments, the rod 540 may extend from or retract within the base 550 so as to allow for the antenna apparatus 510 to move laterally along the surface of the part 570 to be inspected. The rod 450 may also rotate in a circle for rotation of the antenna apparatus 510.

The antenna elements 520 are configured to transmit and to receive ultrasonic signals (e.g., ultrasonic pulses). In particular, the antenna elements 520 are configured to transmit ultrasonic inspection signals (e.g., an initial signal, surface inspection signal, and full part inspection signal) and to receive ultrasonic reflection signals (e.g., a surface reflection signal and back surface reflection signal).

It should be noted that, in one or more embodiments of the disclosed system, a source (e.g., a pulser of pulser/receiver 230 of FIGS. 2A, 2B, and 2C) is configured to transmit the ultrasonic inspection signals via the antenna elements 520, and a receiver (e.g., a receiver of pulser/receiver 230 of FIGS. 2A, 2B, and 2C) is configured to receive the ultrasonic reflection signals via the antenna elements 520.

In this figure, an inspection of the interior surface 560 of a part 570 is shown. During operation, the antenna elements 520 transmit ultrasonic inspection signals to the interior surface 560 of the part 570, and receive ultrasonic reflection signals from the interior surface 560 of the part 570 as the antenna apparatus 510 is moved laterally down the length of the part 570. The rod 540 extends from and/or retracts within the base 550 to move the antenna apparatus 510 laterally along the length of the part 570.

Figure 6:
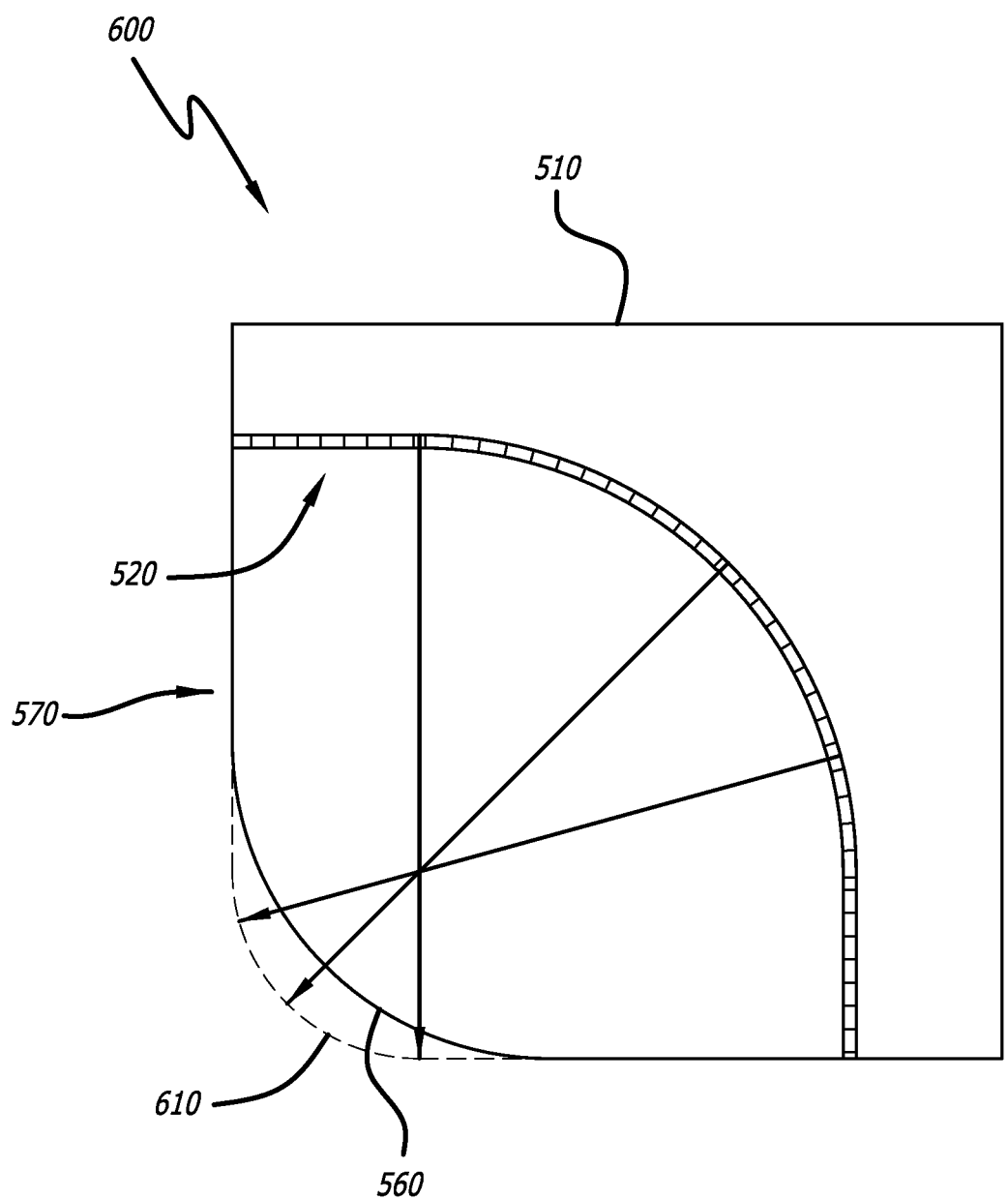
FIG. 6 is a diagram showing antenna elements transmitting an initial signal towards a part, in accordance with at least one embodiment of the present disclosure.

FIG. 6 is a diagram 600 showing antenna elements 520 transmitting an initial signal towards a part 570, in accordance with at least one embodiment of the present disclosure. In this figure, the antenna elements 520 of the antenna apparatus 510 are shown to be transmitting the initial signal towards the interior surface 560 of the part 570. Since the initial signal is determined without knowing the shape of the interior surface 560 of the part 570, the initial signal is not properly focused at the location of the interior surface 560 of the part 570, but rather is improperly focused at another location (e.g., a location 610 beneath the surface 560 of the part 570).

Figure 7:
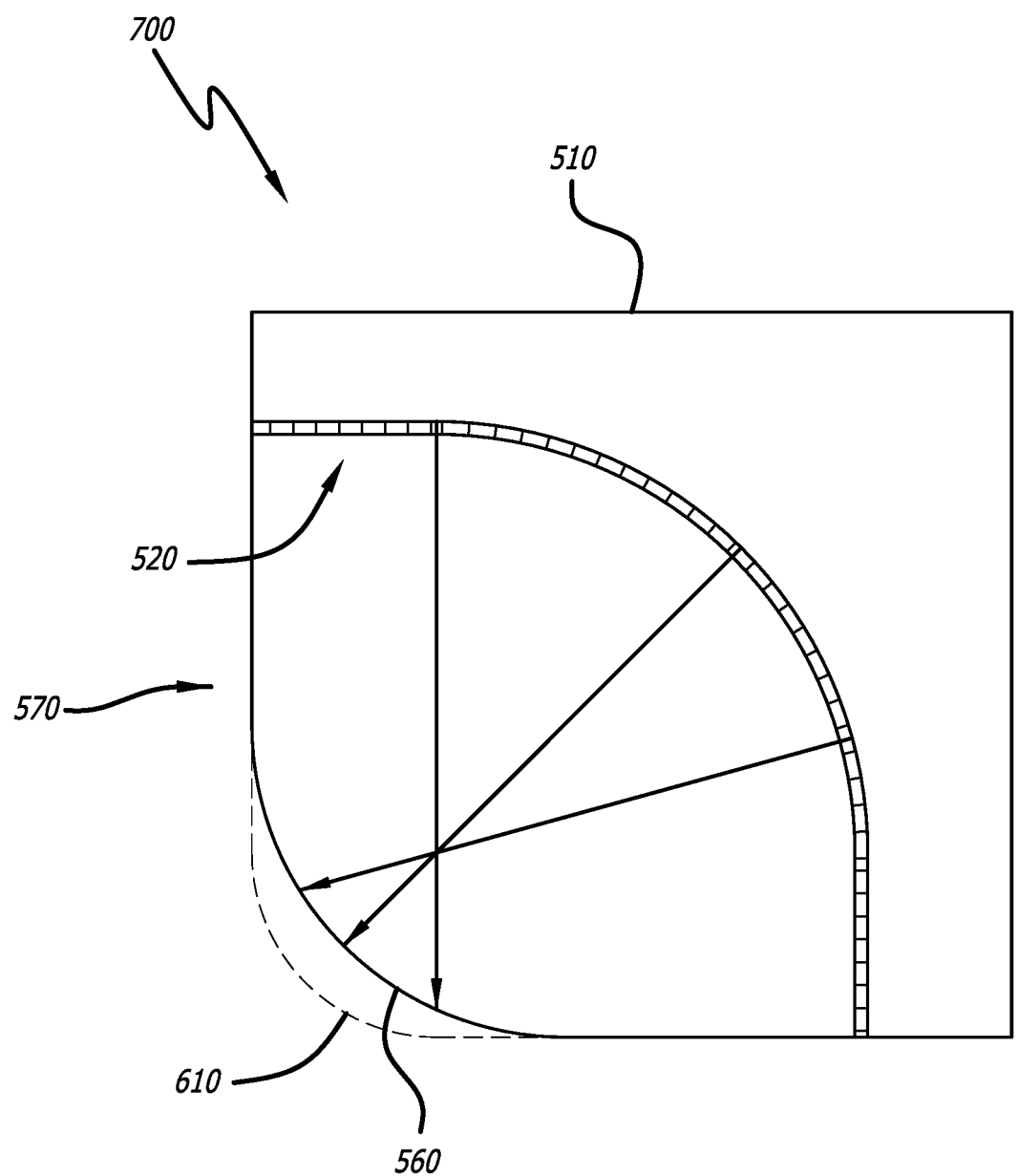
FIG. 7 is a diagram showing antenna elements transmitting a surface inspection signal towards a part, in accordance with at least one embodiment of the present disclosure.

FIG. 7 is a diagram 700 showing antenna elements 520 transmitting a surface inspection signal towards a part 570, in accordance with at least one embodiment of the present disclosure. In this figure, the antenna elements 520 of the antenna apparatus 510 are shown to be transmitting the inspection signal (e.g., a surface inspection signal) towards the interior surface 560 of the part 570. Since the inspection signal is determined with the known shape of the interior surface 560 of the part 570, the inspection signal (e.g., a surface inspection signal) is properly focused at the location of the interior surface 560 of the part 570.

As previously mentioned above, for successful ultrasonic inspection of a laminated composite part, the incident beam must be approximately normal to the surface of the part. In one or more embodiments, the disclosed system uses an initial ultrasonic signal (e.g., an initial pulse) to determine the shape of the surface of the part. The shape of the surface of the part is then used to determine an inspection signal (e.g., a surface inspection signal), which is transmitted approximately normal to the surface of the part, to inspect the surface of the part.

FIGS. 8-11 are diagrams 800, 900, 1000, 1100 showing sections 820, 920, 1020, 1120 of antenna elements 510 transmitting and receiving signals within antenna beams 810, 910, 1010, 1110 to portions 830, 930, 1030, 1130 of the interior surface 560 of a part 570, in accordance with at least one embodiment of the present disclosure. In particular, each of these diagrams 800, 900, 1000, 1100 shows a particular section 820, 920, 1020, 1120 of the antenna elements 520 (e.g., a specific portion of the array of antenna elements 520) configured to transmit signals (e.g., inspection signals) and to receive signals (e.g., reflection signals), which are within antenna beams 810, 910, 1010, 1110, to and from a particular portion 830, 930, 1030, 1130 of the interior surface 560 of the part 570. In these figures, each of the sections 820, 920, 1020, 1120 of the antenna elements 520 are configured to transmit signals such that the signals are transmitted approximately normal to the interior surface 560 of the part 570.

Figure 8:
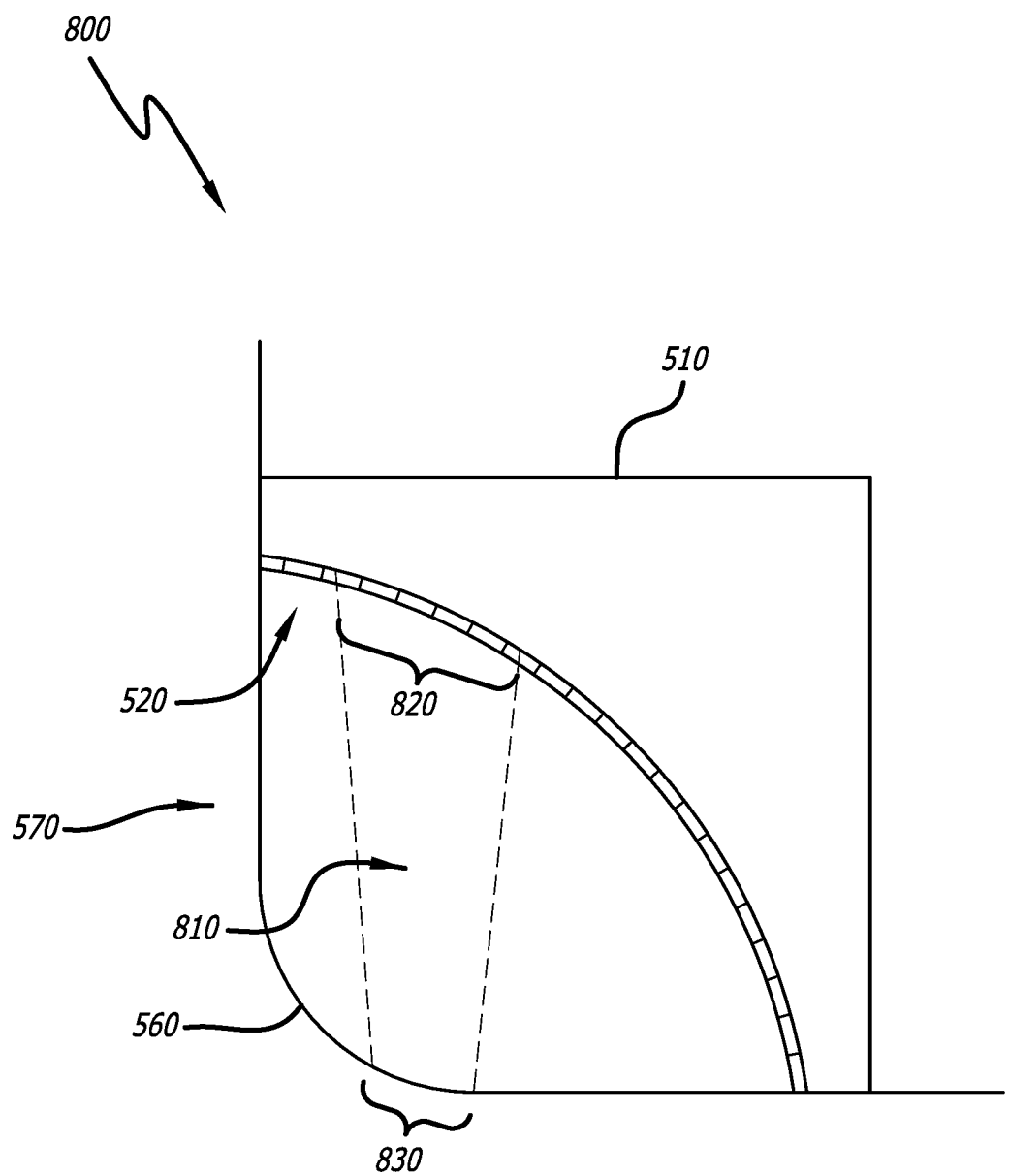
FIGS. 8-11 are diagrams showing sections of antenna elements transmitting and receiving to portions of the surface of a part, in accordance with at least one embodiment of the present disclosure.
Figure 9:
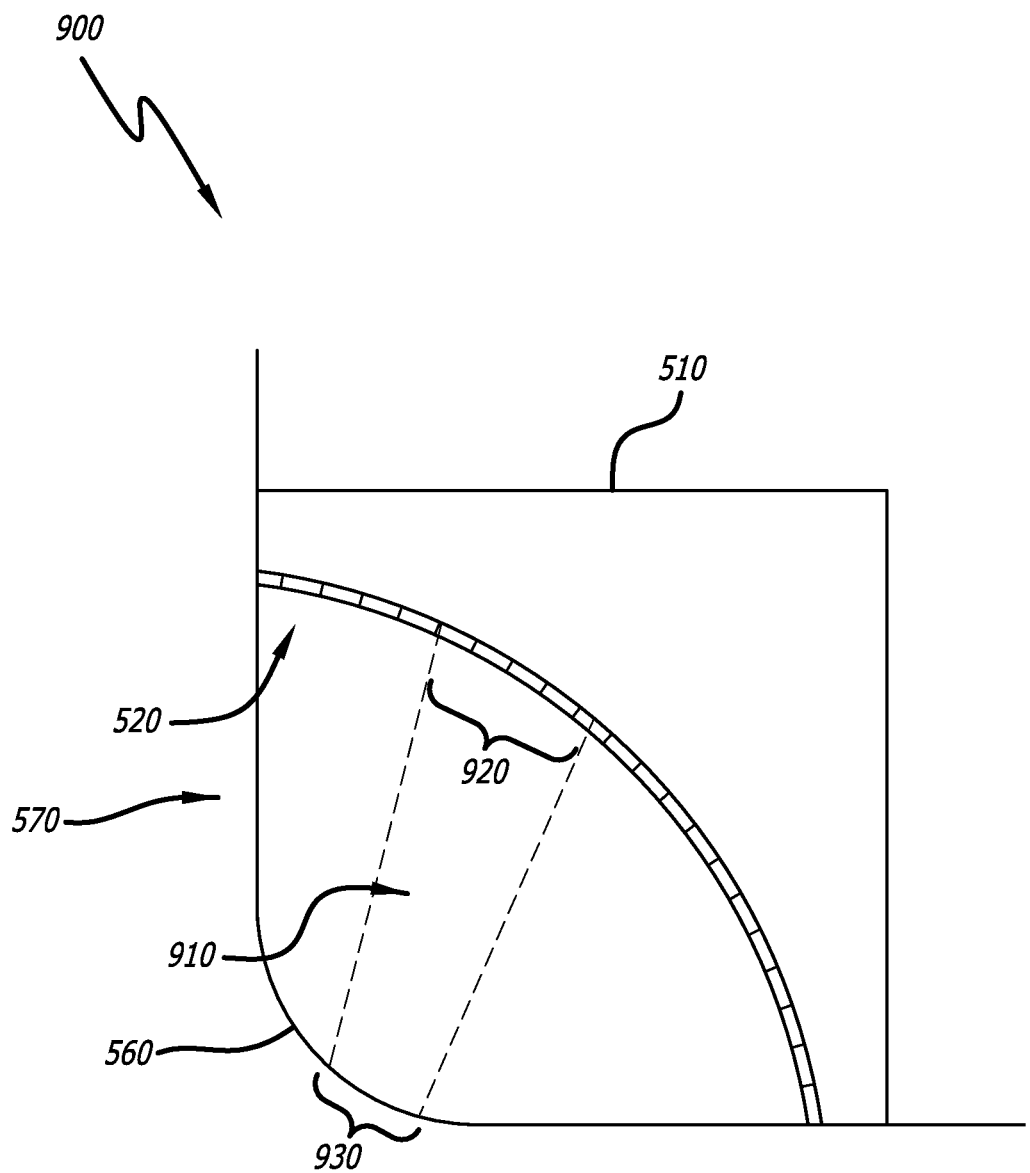
Figure 10:
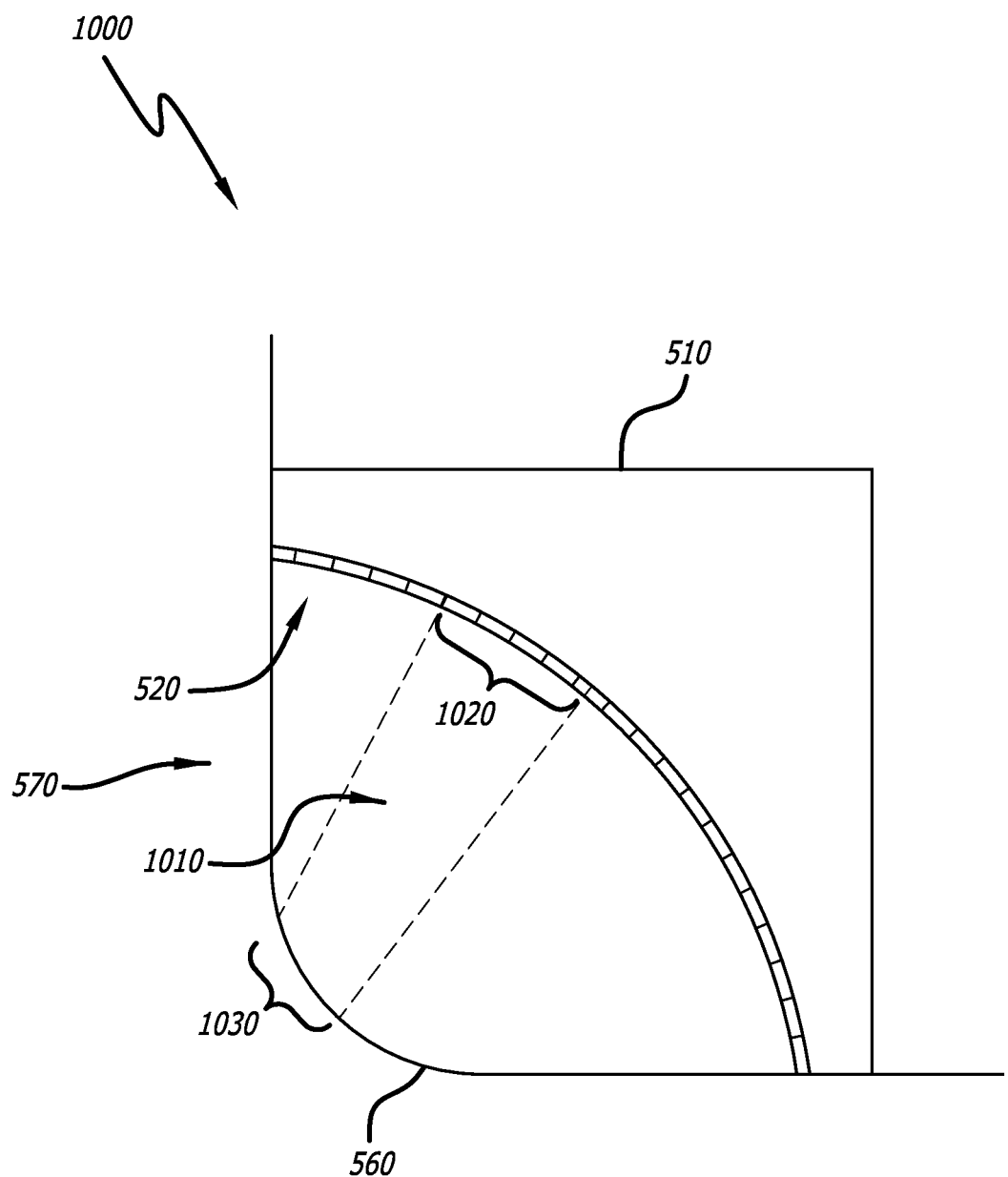
Figure 11:
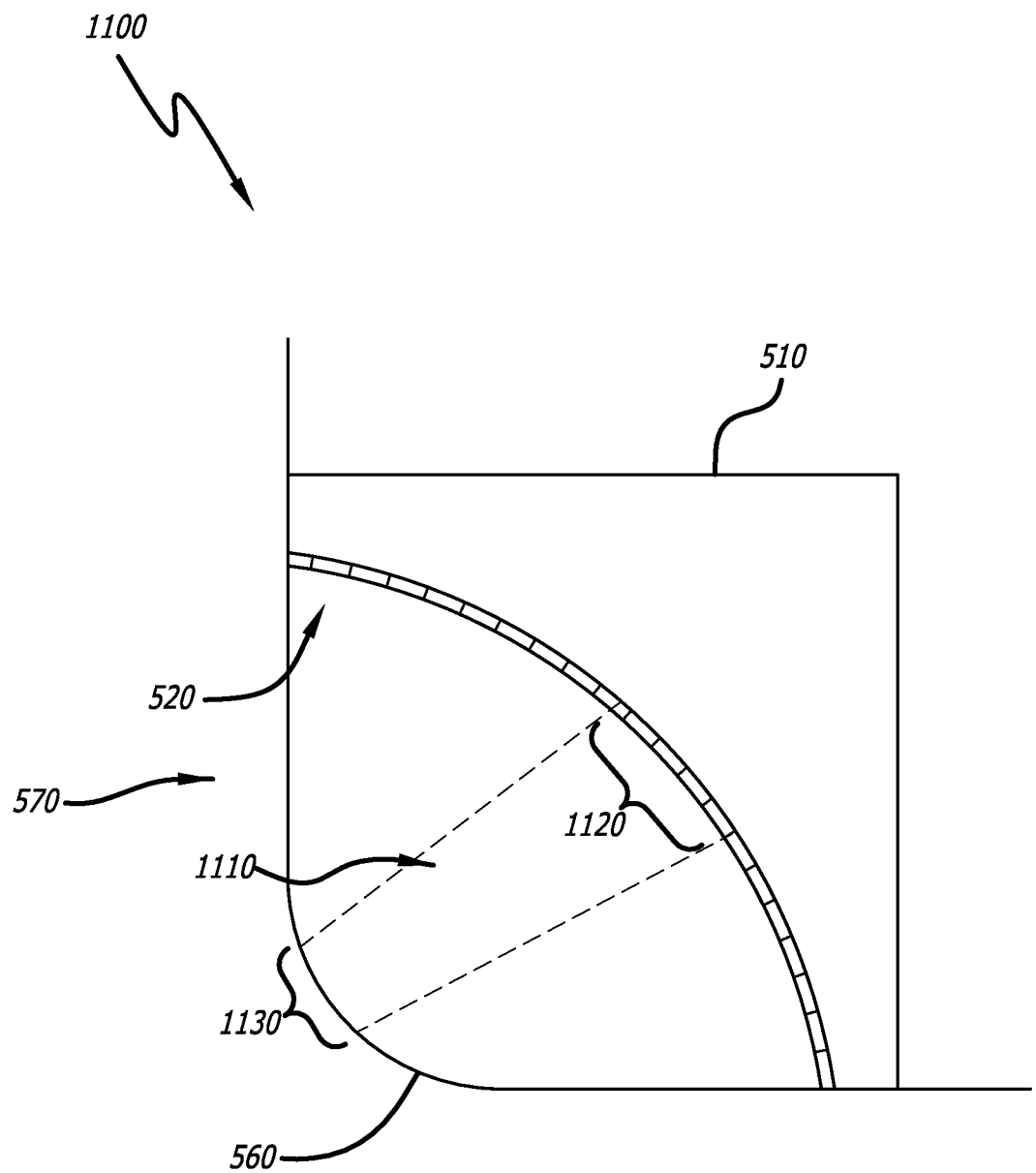

In particular, FIG. 8 is a diagram 800 showing a first section 820 of the antenna elements 520 transmitting and receiving to a first portion 830 of the interior surface 560 of the part 570, in accordance with at least one embodiment of the present disclosure. FIG. 9 is a diagram 900 showing a second section 920 of the antenna elements 520 transmitting and receiving to a second portion 930 of the interior surface 560 of the part 570, in accordance with at least one embodiment of the present disclosure. FIG. 10 is a diagram 1000 showing a third section 1020 of the antenna elements 520 transmitting and receiving to a third portion 1030 of the interior surface 560 of the part 570, in accordance with at least one embodiment of the present disclosure. And, FIG. 11 is a diagram 1100 showing a fourth section 1120 of the antenna elements 520 transmitting and receiving to a fourth portion 1130 of the interior surface 560 of the part 570, in accordance with at least one embodiment of the present disclosure.

Figure 12A:
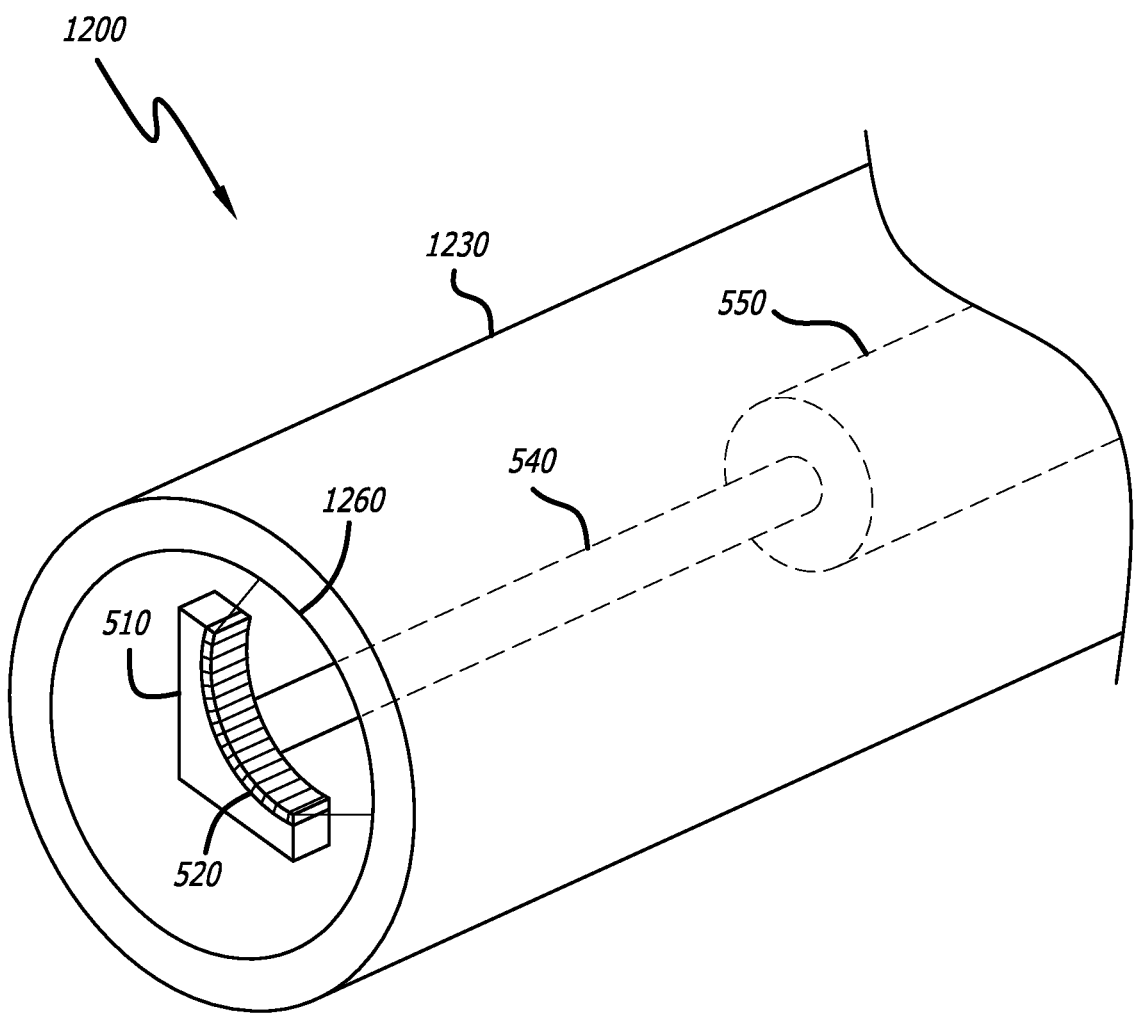
FIG. 12A is a diagram showing the disclosed system for ultrasonic inspection of a part, where the system employs an antenna array apparatus comprising a right-angle shape, in accordance with at least one embodiment of the present disclosure.

FIG. 12A is a diagram 1200 showing the disclosed system for ultrasonic inspection of a part 1230, where the system employs an antenna array apparatus 510 comprising a right-angle shape, in accordance with at least one embodiment of the present disclosure. The antenna apparatus 510 is shown to comprise a plurality of antenna elements 520. Also, the antenna apparatus 510 is shown to be connected to a rod 540, which is connected to a base 550. The rod 540 is configured to extend from or retract within the base 550 to move the antenna apparatus 510 laterally along a surface 1260 of a part 1230. In addition, the rod 540 is configured to rotate in a circle for rotation of the antenna apparatus 510.

In this figure, an inspection of the interior surface 1260 of a part 1230 in the shape of a cylinder is shown. During operation, the antenna elements 520 of the antenna apparatus 510 transmit ultrasonic inspection signals to the interior surface 1260 of the part 1230, and receive ultrasonic reflection signals from the interior surface 1260 of the part 1230 as the antenna apparatus 510 is rotated in a circle and is moved laterally down the length of interior of the part 1230. The rod 540 rotates to rotate the antenna apparatus 510 within the interior of the part 1230, and extends from and/or retracts within the base 550 to move the antenna apparatus 510 laterally along the length of the part 1230.

Figure 12B:
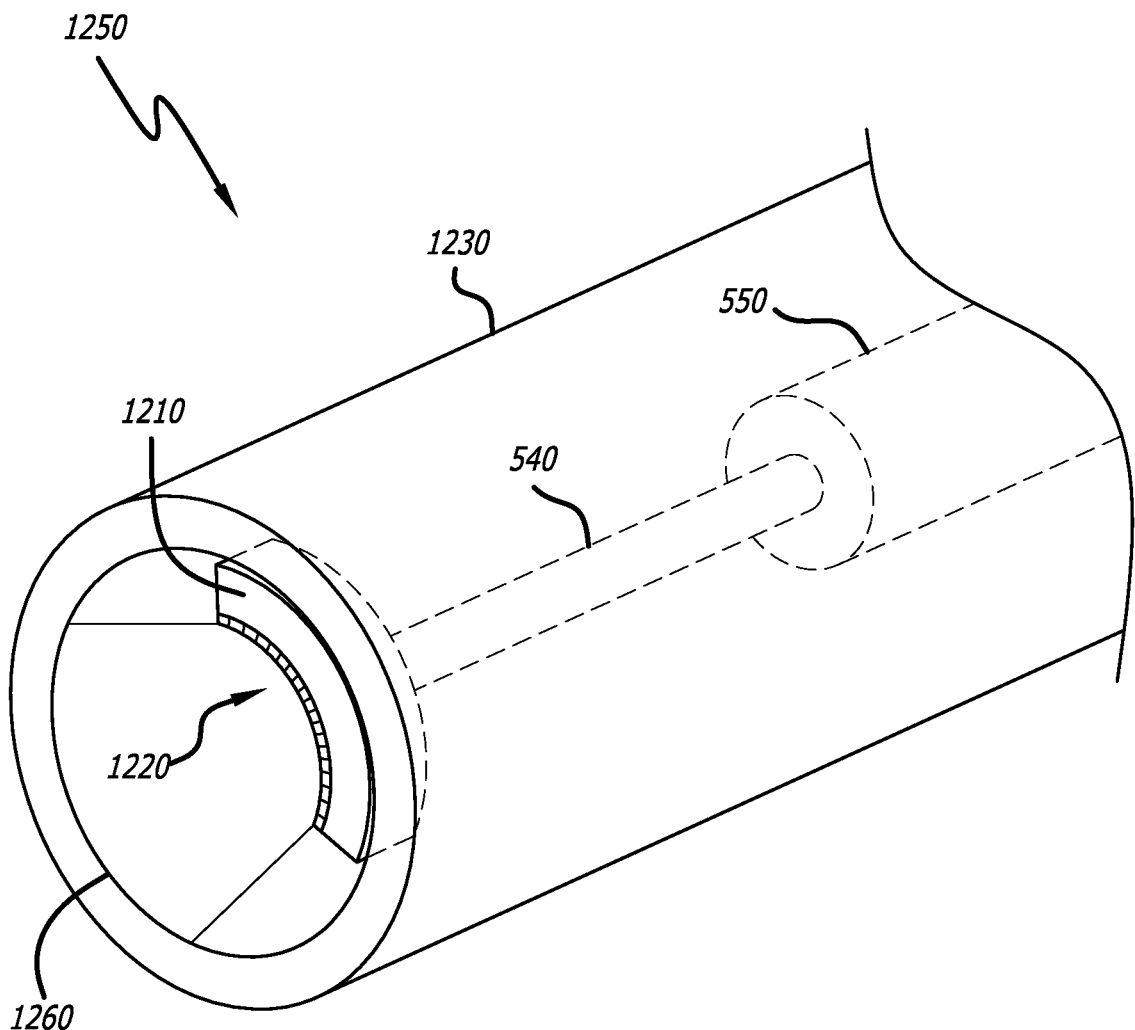
FIG. 12B is a diagram showing the disclosed system for ultrasonic inspection of a part, where the system employs an antenna array apparatus comprising a curved shape, in accordance with at least one embodiment of the present disclosure.

FIG. 12B is a diagram 1250 showing the disclosed system for ultrasonic inspection of a part 1230, where the system employs an antenna array apparatus 1210 comprising a curved shape, in accordance with at least one embodiment of the present disclosure. In this figure, the antenna apparatus 1210 is manufactured such that the top of the antenna apparatus 1210 comprises a curved shape. The curved shape of the top of the antenna apparatus 1210 can be beneficial when inspecting a curved interior surface 1260 of a part 1230 (e.g., the curved interior surface of a cylindrically shaped part) because the curved top side of the antenna apparatus 1210 can lie against the curved interior surface 1260 of the part 1230 as is shown for guiding the rotation of the apparatus 1210 within the interior of the part 1230 for inspection of the curved interior surface 1260 of the part 1230.

The antenna apparatus 1210 is also shown to comprise a plurality of antenna elements 1220 that are configured in an array. It should be noted that the antenna elements 1220 may be configured in other configurations other than an array, such as a matrix. In this figure, the array of antenna elements 1220 is curved and has a concave shape. In other embodiments, the array (or other configuration, such as a matrix) of antenna elements 1220 may be curved in a convex shape.

The antenna apparatus 1210 is connected to a rod 540, which is connected to a base 550. The rod 540 may extend from or retract within the base 550 to allow the antenna apparatus 1210 to move laterally along the surface 1260 of the part 1230 to be inspected. In addition, the rod 450 may rotate in a circle for rotation of the antenna apparatus 1210.

The antenna elements 1220 are configured to transmit and to receive ultrasonic signals (e.g., ultrasonic pulses). Specifically, the antenna elements 1220 are configured to transmit ultrasonic inspection signals (e.g., an initial signal, surface inspection signal, and full part inspection signal) and to receive ultrasonic reflection signals (e.g., a surface reflection signal and back surface reflection signal).

In this figure, an inspection of the interior surface 1260 of a part 1230 in the shape of a cylinder is shown. During operation, the antenna elements 1220 of the antenna apparatus 1210 transmit ultrasonic inspection signals to the interior surface 1260 of the part 1230, and receive ultrasonic reflection signals from the interior surface 1260 of the part 1230 as the antenna apparatus 1210 is rotated in a circle and is moved laterally down the length of interior of the part 1230. The rod 540 rotates to rotate the antenna apparatus 1210 within the interior of the part 1230, and extends from and/or retracts within the base 550 to move the antenna apparatus 1210 laterally along the length of the part 1230.

FIG. 13 illustrates a block diagram of an illustrative computing system 1300 suitable for implementing an embodiment of the present disclosure, in accordance with at least one embodiment of the present disclosure. For example, at least one processor (e.g., which may be located within the combined pulser/receiver 230 of FIGS. 2A, 2B, and 2C, and/or may be located within the antenna apparatus 510 of FIG. 5 and/or the antenna apparatus 1210 of FIG. 12B) of the disclosed system may include and/or employ at least a portion of the disclosed computer system 1300. Computing system 1300 includes a bus 1306 or other communication mechanism for communicating information, which interconnects subsystems and devices, such as processor(s) 1307, system memory 1308 (e.g., RAM), static storage device 1309 (e.g., ROM), disk drive 1310 (e.g., magnetic or optical), communication interface 1314 (e.g., modem or Ethernet card), display 1311 (e.g., CRT or LCD), input device 1312 (e.g., keyboard), and cursor control (not shown).

According to one embodiment of the present disclosure, computer system 1300 performs specific operations by processor(s) 1307 executing one or more sequences of one or more instructions contained in system memory 1308. Such instructions may be read into system memory 1308 from another computer readable/usable medium, such as static storage device 1309 or disk drive 1310. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor(s) 1307 for execution. Such a medium may take many forms, including but not limited to, non-volatile media, volatile media, and transmission media. Non-volatile media includes, for example, optical or magnetic disks, such as disk drive 1310. Volatile media includes dynamic memory, such as system memory 1308.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the present disclosure, execution of the sequences of instructions to practice the present disclosure is performed by a single computer system 1300. According to other embodiments of the present disclosure, two or more computer systems 1300 coupled by communication link 1315 (e.g., LAN, PTSN, or wireless network) may perform the sequence of instructions required to practice the present disclosure in coordination with one another.

Computer system 1300 may transmit and receive messages, data, and instructions, including program, i.e., application code, through communication link 1315 and communication interface 1314. Received program code may be executed by processor 1307 as it is received, and/or stored in disk drive 1310, or other non-volatile storage for later execution. Computer system 1300 may also interact with a database 1332 within a database system 1331 via a data interface 1333 where the computer system 1300 may store and retrieve information or data of the electronic design into and from the database system 1331.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method for inspection of a part, wherein the method comprises:
   transmitting, by a source, an initial signal towards the part;
   reflecting, off of a surface of the part, at least a portion of the initial signal to generate a surface reflection signal;
   receiving, by a receiver, the surface reflection signal;
   determining, by at least one processor, a shape of the surface of the part by using a magnitude of the surface reflection signal and an echo travel time of the initial signal with respect to the surface reflection signal;
   determining, by the at least one processor, a surface inspection signal commensurate with the shape of the surface of the part; and
   transmitting, by the source, the surface inspection signal towards the part for inspection of the surface of the part.

2. The method of claim 1, wherein the initial signal and the surface inspection signal are both ultrasonic signals.

3. The method of claim 1, wherein the initial signal is a pulsed signal.

4. The method of claim 1, wherein the surface inspection signal is a pulsed signal.

5. The method of claim 1, wherein the source and the receiver are combined within a single unit.

6. The method of claim 1, wherein the source transmits the initial signal via antenna elements.

7. The method of claim 6, wherein the antenna elements are configured in an array.

8. The method of claim 7, wherein the array has a concave shape.

9. The method of claim 1, wherein the receiver receives the surface reflection signal via antenna elements.

10. A method for inspection of a part, wherein the method comprises:
    transmitting, by a source, an initial signal towards the part;
    reflecting, off of a surface of the part, at least a portion of the initial signal to generate a surface reflection signal;
    reflecting, off of a back surface of the part, the initial signal to generate a back surface reflection signal;
    receiving, by a receiver, the surface reflection signal and the back surface reflection signal;
    determining, by at least one processor, a shape of the surface of the part by using a magnitude of the surface reflection signal and an echo travel time of the initial signal with respect to the surface reflection signal;
    determining, by the at least one processor, a thickness of the part by using a magnitude of the back surface reflection signal and an echo travel time of the initial signal with respect to the back surface reflection signal;

determining, by the at least one processor, a full part inspection signal commensurate with the shape of the surface of the part and the thickness of the part; and transmitting, by the source, the full part inspection signal towards the part for full inspection of the part.

11. The method of claim 10, wherein the initial signal and the full part inspection signal are both ultrasonic signals.

12. A system for inspection of a part, wherein the system comprises:

a source to transmit an initial signal towards the part, and to transmit a surface inspection signal towards the part for inspection of a surface of the part, wherein at least a portion of the initial signal reflects off of the surface of the part to generate a surface reflection signal;

a receiver to receive the surface reflection signal; and at least one processor to determine a shape of the surface of the part by using a magnitude of the surface reflection signal and an echo travel time of the initial signal with respect to the surface reflection signal, and to determine the surface inspection signal, which is commensurate with the shape of the surface of the part.

13. The system of claim 12, wherein the initial signal and the surface inspection signal are both ultrasonic signals.

14. The system of claim 12, wherein the initial signal is a pulsed signal.

15. The system of claim 12, wherein the surface inspection signal is a pulsed signal.

16. The system of claim 12, wherein the source and the receiver are combined within a single unit.

17. The system of claim 12, wherein the source is configured to transmit the initial signal via antenna elements.

18. The system of claim 17, wherein the antenna elements are configured in an array.

19. The system of claim 18, wherein the array has a concave shape.

20. The system of claim 12, wherein the receiver is configured to receive the surface reflection signal via antenna elements.

* * * * *